March 17, 1953 — L. T. FINIZIE — 2,631,525
COOKING APPARATUS
Filed July 3, 1951 — 3 Sheets-Sheet 1

INVENTOR
Lyonel T. Finizie
BY Rockwell & Bartholow
ATTORNEYS

March 17, 1953 L. T. FINIZIE 2,631,525
COOKING APPARATUS
Filed July 3, 1951 3 Sheets-Sheet 2
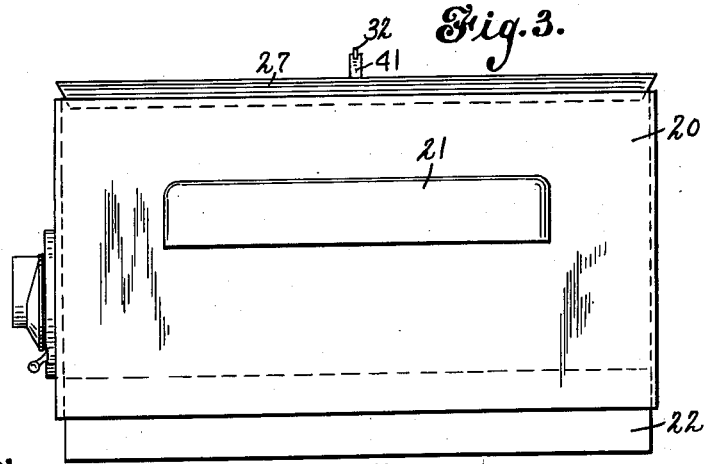
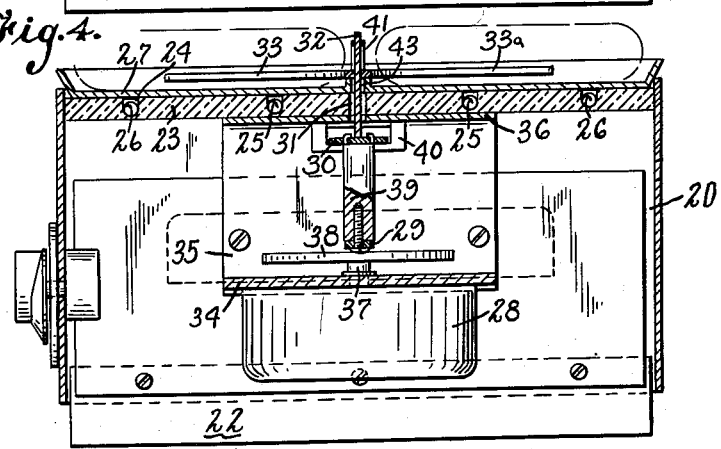
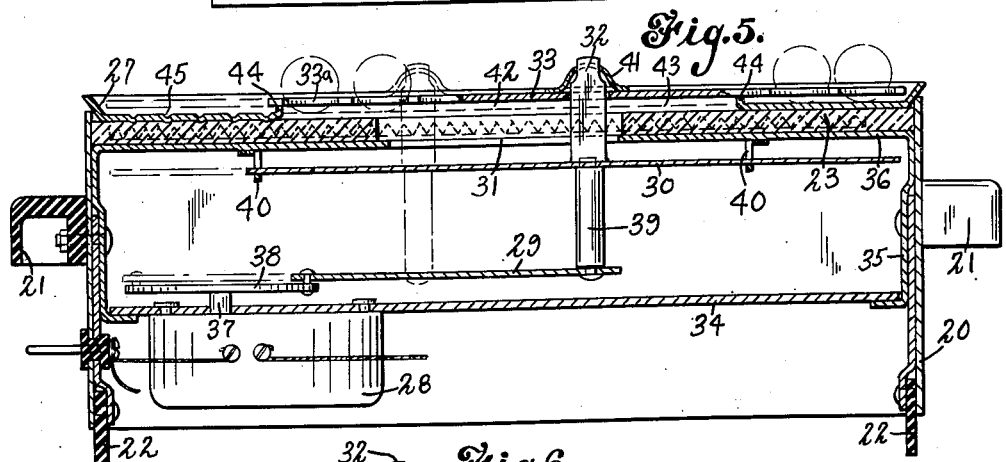
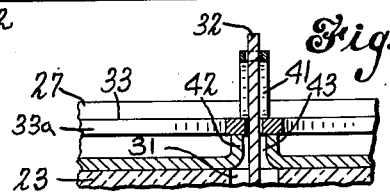
INVENTOR
Lyonel T. Finizie
BY
Rockwell & Bartholow
ATTORNEYS March 17, 1953 L. T. FINIZIE 2,631,525
COOKING APPARATUS
Filed July 3, 1951 3 Sheets-Sheet 3

INVENTOR
Lionel T. Finizie
BY
Rockwell & Bartholow
ATTORNEYS

Patented Mar. 17, 1953

2,631,525

UNITED STATES PATENT OFFICE 2,631,525

COOKING APPARATUS

Lyonel T. Finizie, Grand Prairie, Tex., assignor to Edmond J. Finizie, Bridgeport, Conn.

Application July 3, 1951, Serial No. 235,061

3 Claims. (Cl. 99—423)

This invention relates to cooking apparatus and, while not limited thereto, it pertains especially to an appliance for broiling frankfurters.

An object of the invention is to provide an improved, conveniently operable apparatus in which a number of frankfurters are cooked at the same time and in a uniform manner.

Another object is to provide an improved appliance in which a frankfurter, during the cooking operation, is rolled over a heated cooking surface in such a manner that the article is evenly cooked in substantially all portions thereof.

Another object is to provide means which act positively and effectively to turn the article on its axis as cooking proceeds.

In the accompanying drawings:

Fig. 3 is an end view;

Fig. 4 is a section on line 4—4 of Fig. 1;

Fig. 5 is a section on line 5—5 of Fig. 2;

Fig. 6 is a detail showing on a larger scale certain parts illustrated in Fig. 4;

Figure 1:
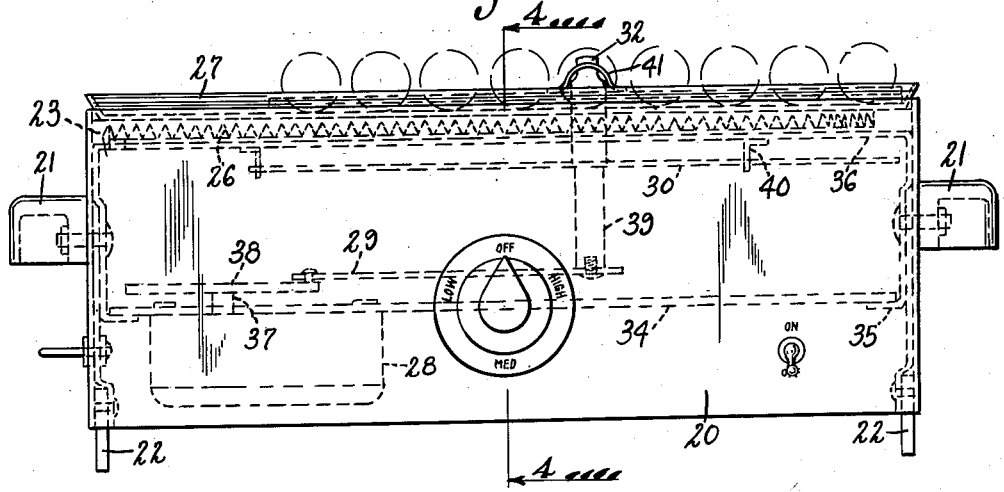
Fig. 1 is a side elevation of a cooking appliance embodying my improvements.

Referring particularly to the form shown in Figs. 1 to 6A, inclusive, this appliance is characterized by a rectangular casing adapted for support upon a suitable table or the like, said casing being open at the bottom and closed at the top. The top of the casing is constructed so as to provide a heating plate having embedded electrical heating wires or elements. Within the interior of the casing is an electric motor drivingly connected through a pitman to a longitudinally reciprocating element in the upper part of the casing, said reciprocating element being connected to an upstanding actuator that projects through and is adapted to slide in a slot in the heating plate. At its upper end, that is to say, at a point located above the heating plate, the actuator is connected to a sliding element in the nature of a grid, which has the function of engaging the frankfurters placed above and heated by the heating plate, and of moving the frankfurters relatively to the heating surface, so that the frankfurters are uniformly cooked in all portions. The frankfurters rest upon a metal surface which is placed over the plate that is electrically heated, and the sliding member or traversing element in this form is spaced upwardly to a slight extent from the surface upon which the frankfurters rest, and this traversing element has at opposite sides of its median longitudinal line a series of slots in which the frankfurters are received in a manner such that longitudinal movement of the traversing element causes a rolling movement of the frankfurters. In this particular form the casing is made of metal and the heating plate of ceramic material, but variations may be made in this and other respects.

In the drawings, the rectangular casing is indicated at 20, the same being open at the bottom, as above stated, and provided at the ends with lifting handles 21 and suitable foot-like supports 22 which rest upon the table without marring its surface. The heating plate is indicated at 23, the same being placed near the top of the casing, and in this form being of refractory ceramic material and having upper grooves 24 in which are placed the coiled loop-shaped heating elements or wires 25 and 26. On the upper surface of the heating plate 23 is a metal plate 27 upon which the frankfurters rest, said plate preferably having an upturned marginal portion, as shown in Figs. 4 and 5, to prevent the flowing of meat juices and grease over the side walls of the casing. The electric motor previously mentioned is indicated at 28, the pitman at 29, the longitudinal reciprocating element in the upper part of the casing at 30, the slot in the upper part of the casing at 31, the actuator previously referred to at 32, and the grid-like sliding traversing element at 33.

Referring particularly to Fig. 5, it will be noted that a longitudinal plate member 34, supported within the casing about midway of the casing height, acts as a support to which the electric motor 28 is fixed, said motor being arranged near the left-hand end of the casing, as shown in Fig. 5, the motor depending from this plate. The plate 34 is supported from a sheet metal plate member 35 that has an upper part 36, said upper part 36 underlying and supporting the plate 23, and downwardly extending portions of the plate 35 at the respective ends of the casing serving to support the plate 34. The upper plate portion 36, previously referred to, is slotted to provide a part of the slot 31, and the remainder of the slot 31 is provided by cutting away the heating plate 23.

The motor 28 drives a shaft 37 which extends upwardly through the plate 34 and has fixed thereto a disk 38, and the disk 38 is operatively connected to the pitman 29 and the pitman in turn is connected to a pin 39 which is suitably connected to the longitudinally guided reciprocating element 30. This element 30 is suitably guided in members such as brackets 40 which depend from the plate portion 36. It is assumed that the casing of the motor 28 contains suitable reduction gearing whereby the shaft 37 is driven at reduced speed with respect to the motor shaft (not shown), the purpose being to move the grid-like traversing element at the requisite low speed.

As will be seen from Figs. 4 and 5, the upper end of the pin 39 is suitably fastened to the intermediate part of the reciprocating element 30, and the actuator 32, previously referred to, is suitably fastened to the reciprocating element at a point above and in line with the pin 39, the actuator preferably being in the form of a flat finger which projects upwardly through the slot 31 and has its upper end suitably fastened to the traversing element 33. Preferably the connection between the upper end of the actuator 32 and the element 33 is of the character shown in Figs. 1, 2, 4, 5 and 6. The width of the actuator finger is reduced at the upper end and the actuator finger projects upwardly through a slot formed in the member 33, and the upper reduced end of the actuator is connected to member 33 by a yoke-like part 41, said part 41 having its ends fastened as by welding to the member 33 and the upper end of the finger extending upwardly through a slot provided in the member 41.

The traversing element 33 is spaced upwardly to some extent from the upper surface of the plate 27 so that the engagement of the element 33 with the frankfurters is somewhat above the lower surfaces of the frankfurters. In this instance this result is obtained by having the body of the element 33 supported in a suitable manner in spaced relationship to the article-supporting surface upon upstanding flanges 42 which are longitudinally disposed and are formed upon the middle part of the plate 27, said flanges 42 providing between them a longitudinal slot 43 in plate 27 in which the actuator 32 is slidable. The slot 43, as best shown in Fig. 5, is somewhat longer than the slot 31. The slot 43 is closed at the ends by portions 44 of plate 27, the construction being such that juices and grease on plate 27 cannot flow into slots 43 and 31.

Figure 2:
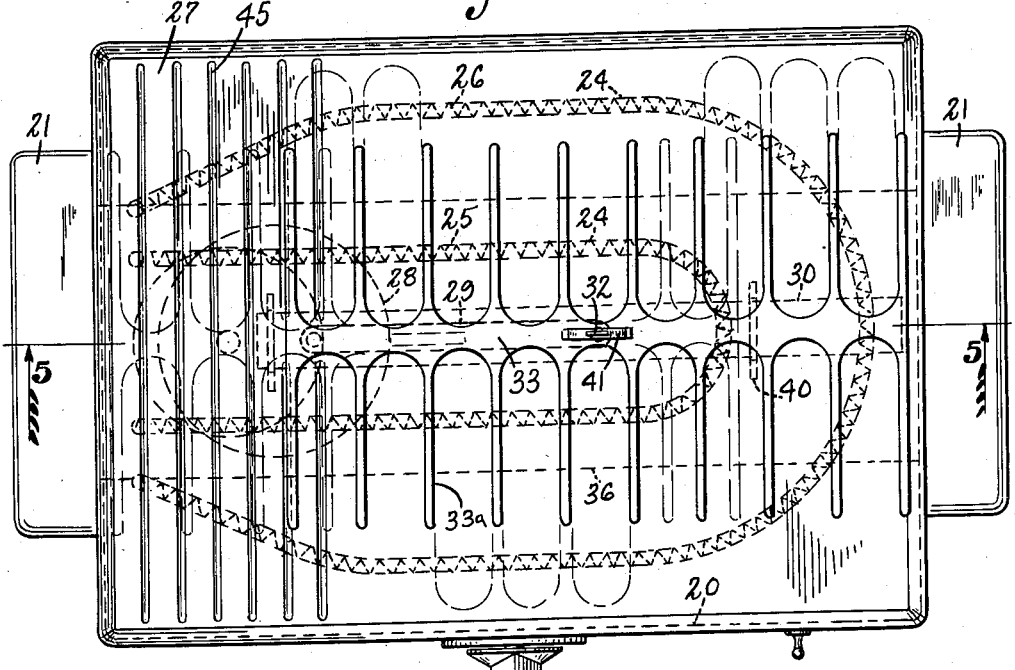
Fig. 2 is a top plan view of the same, the transverse grooving of the heating plate being only partially shown in this and other views.
Figure 6A:
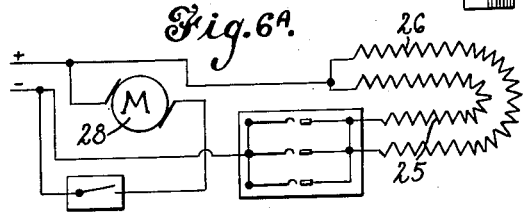
Fig. 6A is a diagram showing the electrical circuit.

It will be noted from Fig. 2 that the traversing element 33 has a solid median portion of metal through which the actuator 32 extends at a point intermediate of the ends of element 33, and that at each side of its median portion the element 33 has a series of recesses or notches 33ᵃ. In the form shown, there are nine notches at each side of the traversing element, but the number may be varied as desired. When the traversing element is moved lengthwise, the portions thereof which are at the sides of the notches engage the frankfurters in regions spaced upwardly somewhat from the surfaces which support the frankfurters whereby rolling movement is imparted to the latter. When the frankfurters are first placed in position on the heating surface and are somewhat cold, they may have a tendency to slide with respect to the heating surface instead of to roll thereon, and to meet this condition it is preferable to provide the upper surface of plate 27 with transverse grooves 45. These grooves should extend over the surface area over which the frankfurters are intended to move, but for purposes of clarity some of the grooving is omitted from the drawing. If a frankfurter by reason of its cold and relatively hard condition commences to slide over the heating surface, it will become engaged with one of the transverse grooves 45, and this will initiate the rolling movement of the article, and as the articles become well heated there will be no further sliding tendency.

In the operation of the device, the heating plate being heated by the resistance wires and the traversing grid being set in reciprocation by closing the circuit of the electric motor, the grid is given a reciprocating movement so that it is slowly moved from a position in which one end of the grid is immediately adjacent one end of the heating surface to a position in which the other end of the grid is moved into adjacency to the other end of the heating surface, this movement in a longitudinal direction being sufficient to give each frankfurter a rolling movement such that it makes at least a complete turn about its axis. On continuation of the operation, the movement is reversed, and the alternate lengthwise movement is continued repeatedly until the cooking of the articles is completed, the effect of the movement being to cause all portions of the articles to be cooked in a very uniform manner. When a given article reaches the point where it is completely cooked, it can be removed by lifting it off of the appliance without arresting the movement of the grid, and a new article to be cooked can be placed in position in the vacated recess or notch without arresting the grid movement.

In the form shown, the appliance has connections by means of which it can be connected to a suitable source of current, and, as shown, there is a small lever switch controlling the operation of the motor, and a rotary control switch for controlling the supply of current to the heating coils and also the heating effect. A typical circuit diagram is shown in Fig. 6ᴬ.

Figure 7:
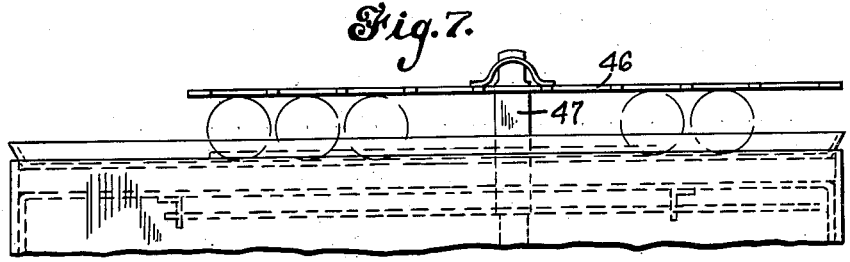
Fig. 7 is a fragmentary side elevation of an appliance of modified form.
Figure 8:
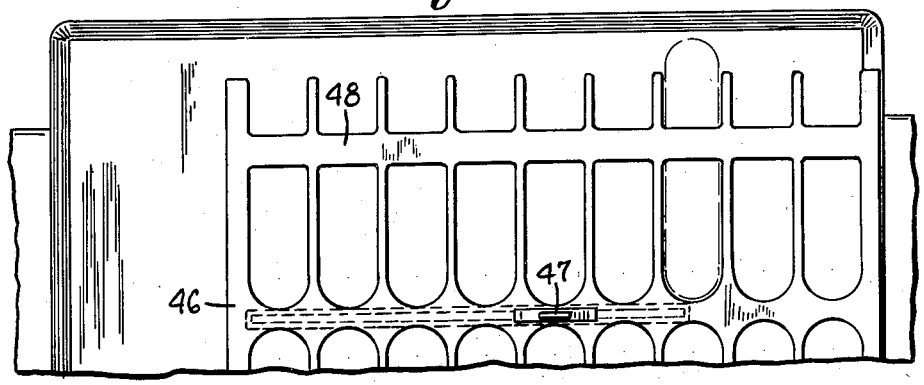
Fig. 8 is a top plan view of the parts shown in Fig. 7.

In the modification shown in Figs. 7 and 8, the structure is similar to that previously described. In this case, however, the grid-like element 46, instead of engaging the articles at the sides of the latter, engages them at the upper surfaces of the articles. Here the arrangement is such that the element 46 has its weight resting upon the articles to be rolled along the heating surface. For this purpose the element 46 is mounted upon the actuator 47 so as to be upwardly slidable thereon, whereby the articles can be placed under the grid-like element so as to be placed in the position for cooking. Thereupon, the grid being reciprocated, the articles are firmly held by the grid against the heating surface by the weight of the grid and are rolled over the heating surface. In this particular case the portion of the grid which bears upon the upper surface of the article is a longitudinal portion 48 extending across the recessed part of the grid, but the articles can engage partially in the respective recesses of the grid.

Figure 9:
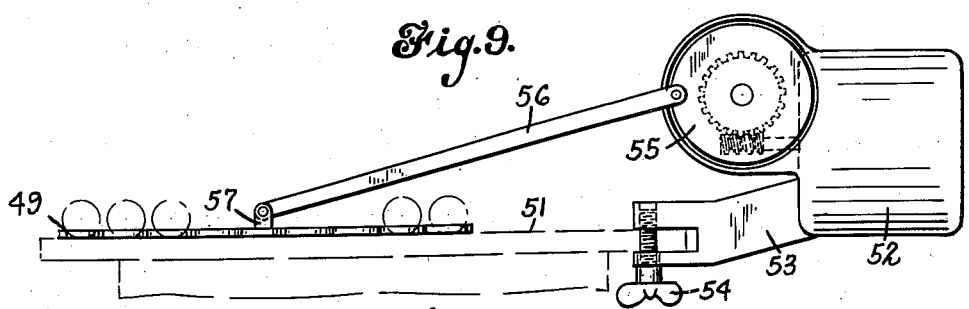
Fig. 9 is a side elevation illustrating a further modification.
Figure 10:
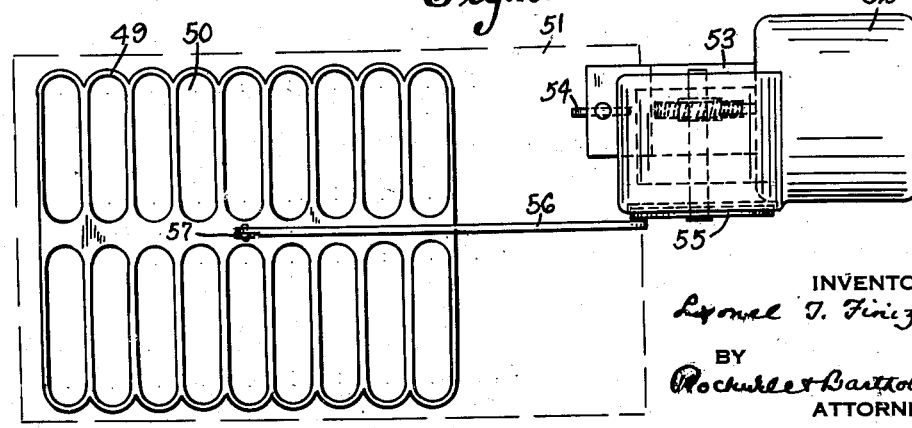
Fig. 10 is a top plan view of the modified form shown in Fig. 9.

In the modified form shown in Figs. 9 and 10, the grid 49, instead of presenting notches that are open at their outer ends, presents a number of elongated recesses 50 receiving the frankfurters, each recess 50 being closed at both ends. In this form, the grid rests upon a heating surface 51, which may be at the upper part of a suitable stove, and a motor attachment for traversing the grid is applicable to the upper part of a stove of appropriate kind, having said heating surface. Here the motor 52 is attached to a bracket 53, which may be attached by a clamping screw 54 to the stove top. The motor rotates a drive disk 55 which is connected by a pitman 56 to an upstanding lug 57 at the middle of the grid 49. As before there is reducing gearing between the motor shaft and the member actuating the pitman.

It will be seen that the invention provides a simple, effective and conveniently operable appliance for cooking frankfurters, having the advantage that the articles are rolled slowly over the heating surface by a mechanical means. Only a minimum of manual manipulation is required, and the articles can be kept under constant observation as long as they are on the heating surface and will be cooked uniformly in all portions, and when the cooking has proceeded to the desired point the articles can be easily and conveniently removed.

The openwork or lattice grid member has effective engagement with the articles to initiate movement thereof over the heating surface. The article-moving grid has especially effective engagement with the articles where the grid engages them at points between the upper and lower surfaces of the articles, the engagement being at the sides of the recesses of the grid, preferably at points spaced upwardly from the heating surface.

While three forms of the device are illustrated, the illustrated disclosure is by way of example only, and further modifications may be adopted and detail changes made without departing from the principles of the invention or the scope of the claims.

What I claim is:

1. In a device such as described, the combination of a member providing a grill for a series of frankfurters, an openwork grid element for the frankfurters disposed over the grill for reciprocating movement and engageable with the frankfurters on the grill, and means including a motor-driven pitman operably connected to the grid element for reciprocating the latter, the reciprocating movement of the grid imparting rolling and translatory movement to the frankfurters, the connection of the pitman to the grid element being approximately at the middle of said element, said element being of substantially rectangular shape and presenting series of frankfurter-receiving recesses opening outwardly at opposite sides of the median line thereof, the grid element being spaced upwardly to some extent from the grill, the grill being provided with a plurality of transverse grooves for initiating the rolling movement of the frankfurters.

2. In an appliance such as described, the combination of a casing having an electrically heated plate adjacent the upper end, a metal plate disposed over said first plate, an electric motor within the casing, a reciprocating drive mechanism within the casing operable from said motor, a sliding actuator projecting upwardly from said drive mechanism through slots in said plates and having its upper end disposed substantially above the upper surface of the second plate, and a grid element disposed over said grill for reciprocating movement and engageable with frankfurters supported on said second plate, said grid being operably connected to said actuator to be reciprocated thereby at a relatively low speed, the reciprocating movement of the grid imparting rolling and translatory movement to the frankfurters, said grid element being spaced upwardly with respect to the surface on which the frankfurters rest, said grid element having a series of frankfurter receiving recesses, the upper surface of the second plate being provided with a plurality of transverse grooves which serve to engage the lower surfaces of the frankfurters and initiate the rolling movement of the frankfurters.

3. In an appliance such as described, the combination of a casing having an electrically heated plate adjacent the upper end, a metal plate disposed over said first plate, an electric motor within the casing, a reciprocating drive mechanism within the casing operable from said motor, a sliding actuator projecting upwardly from said drive mechanism through slots in said plates and having its upper end disposed substantially above the upper surface of the second plate, and a grid element disposed over said grill for reciprocating movement and engageable with frankfurters supported on said second plate, said grid being operably connected to said actuator to be reciprocated thereby at a relatively low speed, the reciprocating movement of the grid imparting rolling and translatory movement to the frankfurters, said grid element being spaced upwardly with respect to the surface on which the frankfurters rest, the upper surface of the second plate being provided with a plurality of transverse grooves which serve to engage the lower surfaces of the frankfurters and initiate the rolling movement of the frankfurters, said actuator being operably connnected to approximately the middle portion of said grid element, said grid element having separate series of frankfurter-receiving recesses at the respective sides of its longitudinal center line.

LYONEL T. FINIZIE.

REFERENCES CITED

The following references are of record in the file of this patent:

UNITED STATES PATENTS

| Number | Name | Date |
| --- | --- | --- |
| 1,570,235 | Fooks | Jan. 19, 1926 |
| 1,988,871 | Kennedy et al. | Jan. 22, 1935 |
| 2,185,979 | Dumas | Jan. 2, 1940 |
| 2,584,061 | Stilphen | Jan. 29, 1952 |

FOREIGN PATENTS

| Number | Country | Date |
| --- | --- | --- |
| 354,915 | France | Oct. 18, 1905 |